United States Patent
Quay et al.

(10) Patent No.: US 10,839,122 B1
(45) Date of Patent: Nov. 17, 2020

(54) AUTOMATIC LAYER TRAIT GENERATION AND PROMOTION COST COMPUTATION

(71) Applicant: International Business Machines Corporation, Armonk, NY (US)

(72) Inventors: Stephen Thomas Quay, Vancouver (CA); Yaoguang Wei, Austin, TX (US); Bijian Chen, Austin, TX (US); Ying Zhou, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/428,049

(22) Filed: May 31, 2019

(51) Int. Cl.
*G06F 30/327* (2020.01)
*G06F 119/12* (2020.01)

(52) U.S. Cl.
CPC ........ *G06F 30/327* (2020.01); *G06F 2119/12* (2020.01)

(58) Field of Classification Search
USPC ....................................................... 716/103
See application file for complete search history.

(56) References Cited

U.S. PATENT DOCUMENTS

| | | | |
|---|---|---|---|
| 6,189,131 B1 | 2/2001 | Graef et al. | |
| 6,349,403 B1 | 2/2002 | Dutta et al. | |
| 8,543,964 B2 | 9/2013 | Ge et al. | |
| 9,092,591 B2 | 7/2015 | Alpert et al. | |
| 9,564,394 B1 | 2/2017 | Roth et al. | |
| 2002/0148637 A1* | 10/2002 | Anstrom | H01L 23/5383 174/255 |
| 2007/0028201 A1 | 2/2007 | Mehrotra et al. | |
| 2010/0152875 A1 | 6/2010 | Fukuda | |
| 2014/0223397 A1* | 8/2014 | Alpert | G06F 30/327 716/104 |
| 2017/0206286 A1* | 7/2017 | Lee | G06F 30/394 |

FOREIGN PATENT DOCUMENTS

JP 2002342401 A 11/2002

OTHER PUBLICATIONS

Deguchi et al., "Timing-Driven Hierarchical Global Routing with Wire-Sizing and Buffer-Insertion for VLSI with Multi-Routing-Layer", Design Automation Conference, 2000, pp. 99-104.
(Continued)

*Primary Examiner* — Mohammed Alam
(74) *Attorney, Agent, or Firm* — Cantor Colburn LLP; Erik Johnson (57) ABSTRACT

A method a system include obtaining a master list of layer traits including wire codes, each of the wire codes indicating a width of a corresponding wire, and including a maximum reach length of the corresponding wire and a time of flight (TOF) through the corresponding wire. The method also includes processing the master list of the layer traits to obtain a final list of the layer traits, the final list of the layer traits having fewer entries than the master list of the layer traits and being in a ranked order. A metric is calculated for each adjacent pair of the layer traits in the final list of layer traits. The final list of the layer traits and the corresponding metric is used to assign the corresponding wires to different interconnects among components of an integrated circuit.

20 Claims, 5 Drawing Sheets

(56) References Cited

OTHER PUBLICATIONS

Hu et al., "A Fully Polynomial-Time Approximation Scheme for Timing-Constrained Minimum Cost Layer Assignment", IEEE Transactions on Circuits and Systems-II: Express Briefs, vol. 56, No. 7, Jul. 2009, pp. 580-584.

Moffitt et al., "Wire Synthesizable Global Routing for Timing Closure", 16th Asia and South Pacific Design Automation Conference, 2011, pp. 545-550.

\* cited by examiner

| min layer (label) | wire code | TOF | ΔTOF | reach length | Δreach | pitch on use layer | TOF ratio | pitch ratio | worth_ratio | metric |
|---|---|---|---|---|---|---|---|---|---|---|
| M2 | default | 933 | | 0.034 | | 41 | | | | |
| C4 | default_2 | 448 | -52% | 0.062 | 82% | 80 | | | | 30 |
| C6 | default_2 | 345 | -23% | 0.074 | 19% | 80 | 1.30 | 1.00 | 1.30 | 8 |
| C4 | W22S20L47P_2 | 299 | -13% | 0.091 | 23% | 160 | 1.50 | 2.00 | 0.75 | 4 |
| K1 | W22S20L47P_2 | 221 | -26% | 0.131 | 44% | 128 | 2.03 | 1.60 | 1.27 | 10 |
| C6 | W30S15L8BTP_2 | 184 | -17% | 0.138 | 5% | 240 | 2.44 | 3.00 | 0.81 | 5 |
| H1 | W15S15LCDDP_2 | 82 | -25% | 0.464 | 61% | 360 | 5.48 | 4.50 | 1.22 | 12 |
| E1 | W30S20LCDTP_2 | 66 | -19% | 0.533 | 15% | 768 | 6.75 | 9.60 | 0.70 | 8 |
| H1 | W20S20LEFTP_2 | 53 | -21% | 0.752 | 41% | 720 | 8.52 | 9.00 | 0.95 | 10 |

AUTOMATIC LAYER TRAIT GENERATION AND PROMOTION COST COMPUTATION

BACKGROUND

The present invention relates to a routing phase of integrated circuit development, and more specifically, to automatic layer trait generation and promotion cost computation.

Integrated circuits or chips are designed and fabricated using a number of processes. The processes associated with designing the chip include obtaining a register transfer level (RTL) description and performing physical design to identify and place components such as gate logic. The physical design processes generally begin with logic synthesis, which maps the RTL description to a gate-level netlist (i.e., list of logical interconnects), and end with tapeout and mask generation, which refers to turning the design data into photomasks that are used in the manufacturing process. The physical design processes also include routing, which refers to adding the wires that connect gates and other components in the netlist to implement the logic design.

SUMMARY

Embodiments of the present invention are directed to methods, systems, and computer program products. A method includes obtaining a master list of layer traits including wire codes, each of the wire codes indicating a width of a corresponding wire, and including a maximum reach length of the corresponding wire and a time of flight (TOF) through the corresponding wire. The method also includes processing the master list of the layer traits to obtain a final list of the layer traits, the final list of the layer traits having fewer entries than the master list of the layer traits and being in a ranked order. A metric is calculated for each adjacent pair of the layer traits in the final list of layer traits, the calculating using the TOF of each of the pair of the layer traits and the metric being associated with using one of the pair of the layer traits instead of another of the pair of layer traits. The final list of the layer traits and the corresponding metric is used to assign the corresponding wires to different interconnects among components of an integrated circuit.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, the routing process within the physical design phase of integrated circuit development involves adding the wires specified by the netlist. The components (e.g., logic gates, buffers, flip-flops) that implement the functionality of the integrated circuit are in the silicon layer while the wires that interconnect them (i.e., connect an output pin of one component to the input pin of another component) are formed on multiple vertical levels that are referred to as layers. Via holes are used to traverse the layers such that a given interconnecting wire can be in any one of the various layers. Wires formed on higher layers can generally be thicker and wider than wires formed on lower layers. As a result, higher metal layers (i.e., wires formed of metal on higher layers) exhibit lower resistance and faster signal propagation speeds than lower metal layers (i.e., wires formed on lower layers). Yet, forming every wire as a higher metal layer is not feasible due to congestion issues. Thus, an important part of generating the routing specification involves balancing the tradeoff between speed and congestion to determine which wires should be formed on which layers.

Consequently, the determination of which layer a given wire should be formed on must consider the timing requirements for the component receiving a signal through the given wire. That is, if the given wire is formed as too low a layer (i.e., is too limited in width and thickness), the signal may not reach the component within a required arrival time. Layer promotion (i.e., the designation of a higher layer) can be used to decrease the propagation time for a signal between the interconnected components and ensure that timing requirements are met. Layer promotion requires a balancing of the timing benefits of moving wires to a higher layer with the fact that not all wires can be put in higher layers because of the spacing required between wires and other congestion issues. Optimization algorithms use information referred to as layer traits to place each wire defined by the netlist in a particular layer during routing. A trait is essentially a constraint on the routing program and specifies characteristics for layers (e.g., width, spacing) in the form of a wire code and the layers at which those characteristics can be used. Additional information for a trait includes a metric, referred to as cost, for promoting a wire to a given layer. The cost indicates the improvement in delay or another parameter of interest that must be gained in order to justify the layer promotion.

Prior approaches to routing include the manual generation of a layer trait library for use in generating specifications for the routing program. The layer trait library lists wire codes with associated information. A wire code indicates the wire width and spacing. As previously noted, the information associated with each wire code can include promotion cost and the minimum metal layer that a metal layer with characteristics indicated by the wire code can be assigned to. Promotion cost is an indication of the minimum improvement (e.g., in signal delay) that must be achieved in order to justify layer promotion to a metal layer with the characteristics indicated by the wire code at the corresponding minimum metal layer or higher. Not only is the layer trait library generated manually according to the prior approach, but it also includes promotion costs that are not computed but, rather, intuited based on the experience and expertise of developers who generate the layer trait library.

Embodiments of the invention that are detailed herein relate to automatic layer trait generation and promotion cost computation. A master list of layer traits is automatically processed and ordered in order to generate a final, reduced layer trait list. Promotion cost is then computed for each layer trait in the reduced layer trait list.

Figure 1:
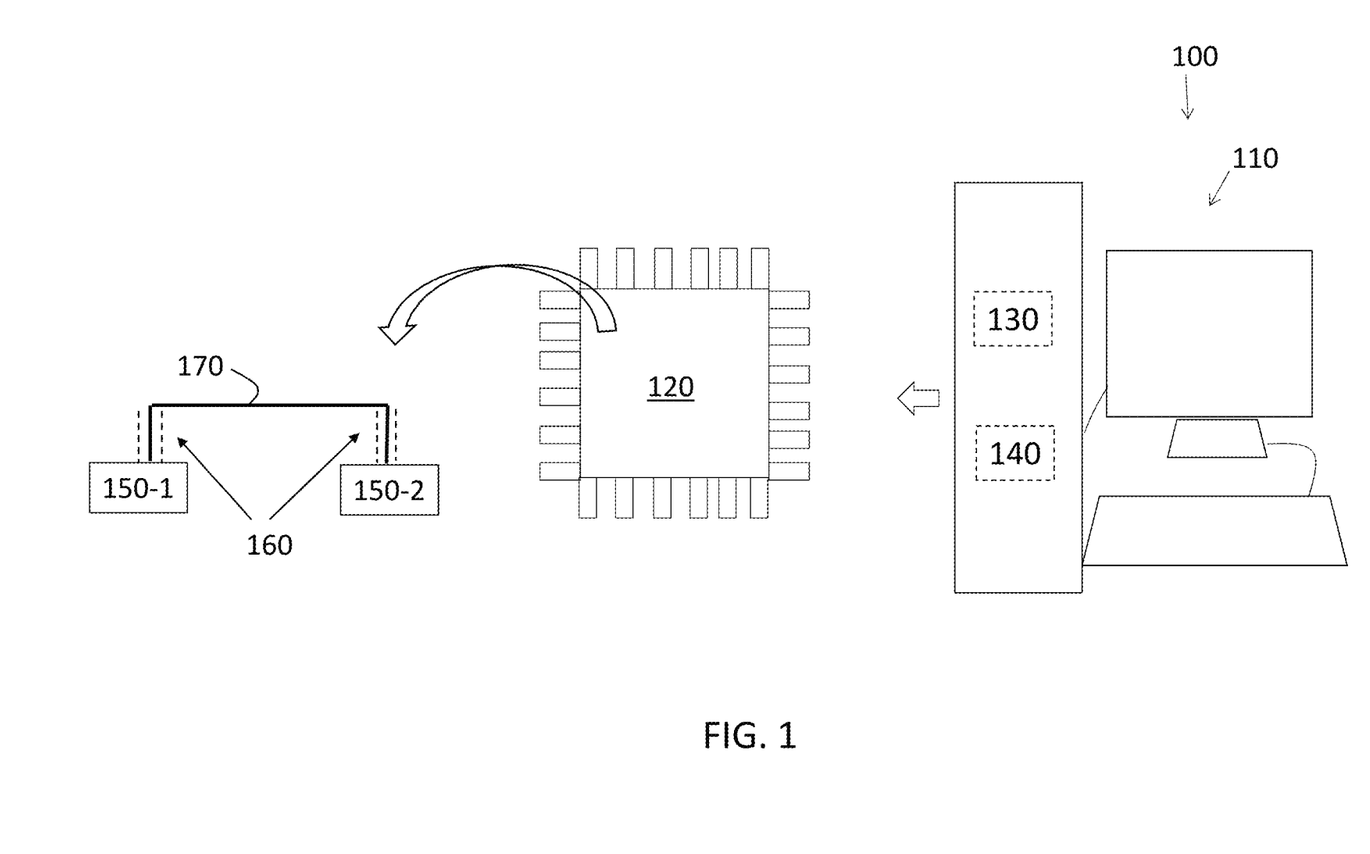
FIG. 1 is a block diagram of a system to perform the automatic layer trait generation and promotion cost computation used in integrated circuit development according to embodiments of the invention.

FIG. 1 is a block diagram of a system 100 to perform the automatic layer trait generation and promotion cost computation used in integrated circuit development according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, based, in part, on using the automatic layer trait generation and promotion cost computation according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 5.

The processing circuitry 110 includes one or more memory devices 130 and one or more processors 140. Multiple of the processors 140 may be used in the integrated circuit design and, specifically, the automatic layer trait generation and promotion cost computation detailed herein. The memory device 130 stores instructions implemented by the processor 140. As further discussed, these instructions include processes used to generate the layer trait list and compute promotion cost, as further discussed below. Exemplary components 150-1 and 150-2 (generally referred to as 150) of the integrated circuit 120 are shown with a wire 170 interconnecting them. The wire 170 characteristics (e.g., width, depth) are defined by the level on which the wire 170 is formed, and the delay associated with the wire 170 carrying a signal from component 150-1 to component 150-2 is based on the characteristics of the wire 170. The total path of the exemplary wire 170 begins at an output terminal of the component 150-1, through a via 160, and then through another via 160 to an input terminal of the component 150-2. The time for a signal to traverse that path is referred to as the time-of-flight (TOF). TOF may be provided in picoseconds/millimeter, for example.

Figure 2:
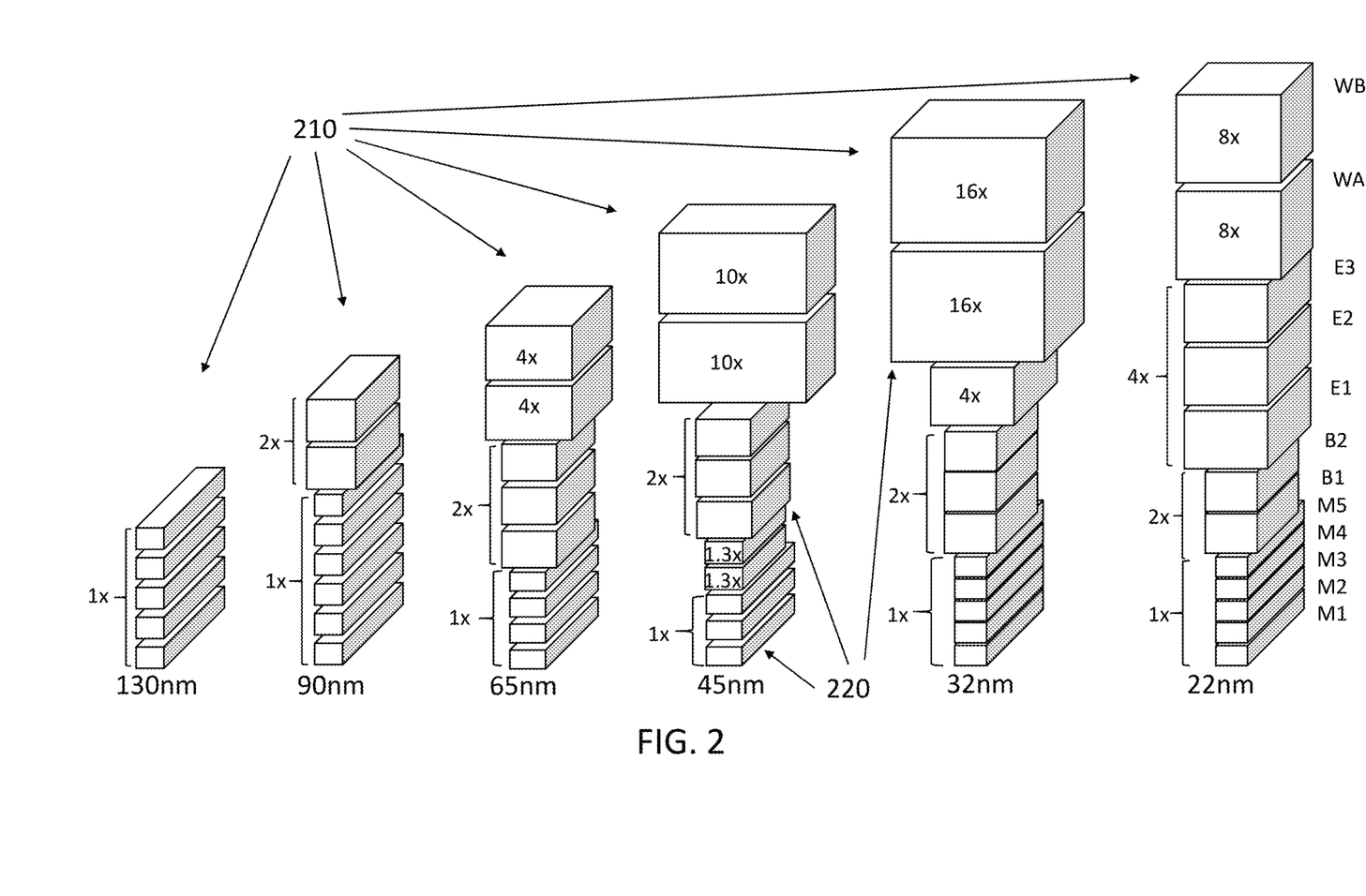
FIG. 2 is a block diagram of exemplary metal layer stacks in integrated circuits corresponding to different technology nodes that are subject to automatic layer trait generation and promotion cost computation according to one or more embodiments of the invention.

FIG. 2 is a block diagram of exemplary metal layer stacks 210 in integrated circuits corresponding to different technology nodes that are subject to automatic layer trait generation and promotion cost computation according to one or more embodiments of the invention. Exemplary metal layer stacks 210 associated with integrated circuits of six different technology nodes—130 nanometer (nm), 90 nm, 65 nm, 45 nm, 32 nm, and 22 nm—are shown in FIG. 2. Each metal layer stack 210 includes a number of metal layers 220. The particular set of metal layers 220 that make up the metal layer stack 210 can be different for an integrated circuit of a given technology node. An exemplary minimum metal width (i.e., the 1× width) of a metal layer 220 can be 90 nm. The maximum width among the exemplary metal layers 220, shown in FIG. 2, is 16× that minimum width or 1.44 micro meters. Exemplary labels (e.g., M1, E2, WA) for the different metal layers 220 are indicated for the 22 nm technology node. These labels can be part of the layer trait information. For example, the minimum metal layer 220 at which a particular width can be used may be indicated.

Exemplary wire codes are discussed for explanatory purposes. The exemplary wire codes are descriptive representations of an underlying table of rules indicating the width and spacing associated with a particular layer trait that the wire code is part of. A simple wire code (e.g., default) can specify a minimum width and spacing for a corresponding wire 170 on every metal layer 220 that is used to route the wire 170. The corresponding wire 170 is a reference to the subsequent assignment of a given layer trait, which includes the associated wire code, to a wire 170 using the optimization algorithms. The assignment follows the automatic layer trait generation and promotion cost computation that is further detailed with reference to FIG. 3. A more complex wire code can specify different non-minimum widths and spacings for each metal layer 220 used to route a corresponding wire 170. For example, a single wide width and spacing can be specified for the top metal layers 220 (e.g., 8× on WA and WB), a double wide width and spacing can be specified for middle metal layers 220 (e.g., double the 4× on E1, E2, and E3), a triple wide width and spacing can be specified for lower metal layers 220 (e.g., triple the 2× on B1 and B2), and a quadruple wide width and spacing can be specified for the lowest metal layers 220 (e.g., quadruple the 1× on M1 through M5).

An exemplary wire code that representing routing rules is W22S20L47P_2. The "W" indicates width and the "S" indicates spacing. Thus, the exemplary wire code specifies a width of 2.2× and a spacing of 2× on layer ranges following "L," which are layers 4 to 7. Layers above layer 9 are specified using hexadecimal notation. The "P" indicates that the corresponding wire 170 should be routed next to a power rail if possible to provide noise shielding. Finally, "_2" or, in other cases, "_1" or "_3" are relative indications of wire width and strapping (i.e., redundant wire connections) that should be used to connect to the output pin of the "sending" component 150-1. As another example, W20S20LEFDP_2 indicates an underlying table of rules that include a specification of 2× width "W20" and 2× spacing "S20." The layer range indicated by "L" is "E" or 14 to "F" or 15. The "D" indicates double width for the layers below "E" or 14.

As previously noted and as shown in FIG. 2, wires 170 formed on higher level metal layers 220 of a given metal layer stack 210 can generally be wider and thicker than those formed on lower level metal layers 220. As a result, interconnecting wires 170 formed on higher metal layers 220 generally exhibit lower resistance and result in reduced delay for transmission of a signal between two components 150 that are interconnected. However, fewer wires 170 can be accommodated on the higher metal layers 220 due to the increased width that is occupied by each. As such, both faster transmission speeds and congestion of wires 170 must be considered in determining the final routing design. This effort is aided by the automatic layer trait generation and promotion cost computation according to one or more embodiments of the invention.

Figure 3:
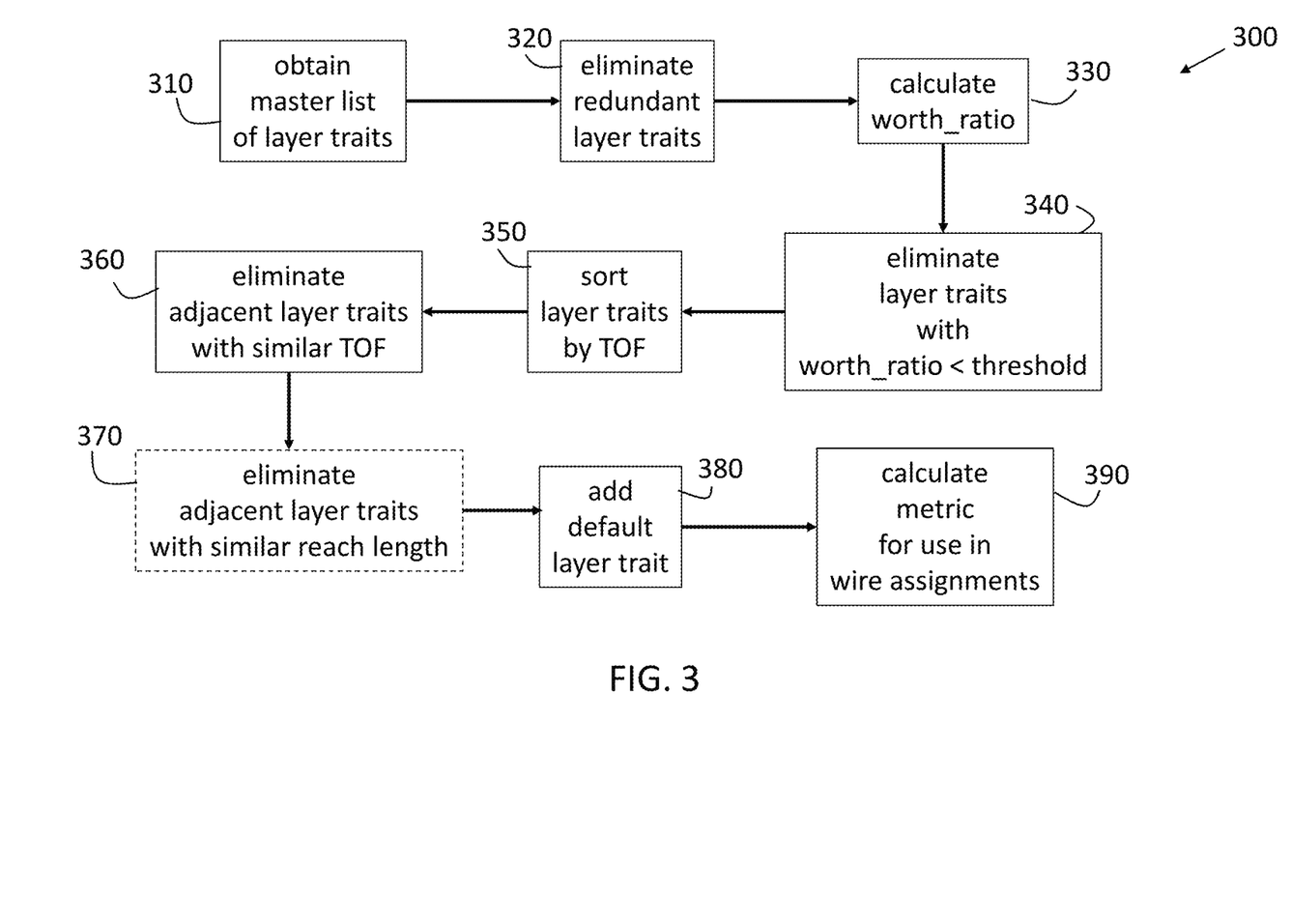
FIG. 3 is a process flow of a method of performing automatic layer trait generation and promotion cost computation according to one or more embodiments of the invention.

FIG. 3 is a process flow of a method 300 of performing automatic layer trait generation and promotion cost computation according to one or more embodiments of the invention. At block 310, the processes include obtaining a master list of layer traits. The master list can be specific to a technology node and associated metal layer stack 210. Using the optimization algorithms to select wires 170 from the master list of layer traits would be prohibitive in terms of the runtime required. At block 320, eliminating redundant layer traits refers to pruning entries from the master list of layer traits based on the similarity in associated TOF. TOF associated with each layer trait is a known value that may be obtained or determined based on testing.

Specifically, layer traits from the master list are first grouped for comparison of their associated TOF. Each grouping is based on the bottom two layers of the layer range being the same or having similar resistor capacitor (RC) characteristics and on the width specified by the wire code being the same. RC characteristics can be quantified as an RC product, the product of resistance per unit length and capacitance per unit length, for example. RC characteristics of two layers can be considered similar based on their RC products being within a threshold percentage (e.g., 1 percent) of each other. For example, a pair of layer traits may have the wire codes default and default_2 that apply to the bottom two metal layer 220 labelled as C4 and H2 with width specified as 1×. If, for example, the TOF of default_2 is lower than the TOF for default, then the layer trait entry associated with the default wire code is eliminated from the master list of layer traits.

As another example, TOF may be compared for another pair of layer traits with corresponding wire codes W20S20LEFDP_2 and W20S20LEFTP_2. Both wire codes specify a width of 2× and a layer range E to F, which corresponds with layers 14 and 15. The labels for these layers may be H1 and H2, for example. Thus, the two wire codes may be part of a grouping for H1 H2 2×. Based on having a lower TOF, the layer trait listing in the master list of layer traits that includes wire code W20S20LEFTP_2 is retained and the layer trait listing in the master list of layer traits that includes wire code W20S20LEFDP_2 is eliminated at block 320.

At block 330, a metric referred to as worth_ratio is determined for each entry of layer traits remaining in the master list of layer traits following the purge at block 320. The exemplary layer trait entries in Table 1 are used for explanatory purposes to describe the determination of the worth_ratio. While layer trait parameters that are relevant to the worth_ratio are indicated, the layer trait entries can include additional parameters.

TABLE 1

Exemplary layer trait entries.

| layer range (labels) | wire code | TOF | Pitch | TOF ratio | Pitch ratio | worth_ ratio |
|---|---|---|---|---|---|---|
| C4 H2 | default_2 | 448.18 | 80 | | | |
| C4 H2 | W22S20L47P_2 | 298.99 | 160 | 1.50 | 2.0 | 0.75 |
| C4 H2 | W30S15L8BTP_2 | 268.11 | 240 | 1.67 | 3.0 | 0.56 |

The layer trait entry with the slowest time of flight (i.e., the highest TOF value), the first entry in Table 1, is considered the base trait for purposes of determining the worth_ratio. For each additional layer trait entry (i.e., the second and third entries in Table 1), TOF ratio is determined as TOF of the base entry (448.18) divided by TOF of the current entry, and pitch ratio is determined as the pitch of the current entry divided by the pitch of the base entry (80). The worth_ratio is then a ratio of TOF ratio to pitch ratio. Thus, for the second entry, for example, the TOF ratio is 448.18/298.99 (=1.5), the pitch ratio is 160/80 (=2), and the worth_ratio is 1.5/2 (=0.75).

At block 340, eliminating layer traits with a worth_ratio below a threshold value represents a second pruning process. For example, the threshold worth_ratio value may be 70 percent (%) or 0.70. In that case, the third entry in Table 1 with a worth_ratio of 0.56 would be eliminated at block 340. At block 350, the processes include sorting the remaining entries of layer traits by TOF. At block 360, eliminating adjacent layer traits with similar TOF from the sorted entries resulting from block 350 represents the third pruning process. The processes at blocks 350 and 360 are illustrated with Table 2. While layer trait parameters that are relevant to the difference in TOF (i.e., delta TOF (ΔTOF)) are indicated in Table 2 for explanatory purposes, the layer trait entries can include additional parameters.

TABLE 2

Exemplary sorted layer trait entries.

| layer range (labels) | wire code | TOF | ΔTOF | Pitch | worth_ratio |
|---|---|---|---|---|---|
| C4 H2 | default_2 | 448.2 | | 80 | |
| C6 H2 | default_2 | 344.6 | −23% | 80 | 1.30 |
| C4 H2 | W22S20L47P_2 | 299.0 | −13% | 160 | 0.75 |
| K1 H2 | W22S20L47P_2 | 221.0 | −26% | 128 | 1.27 |
| C6 H2 | W22S20L47P_2 | 204.1 | −7% | 160 | 1.03 |

As Table 2 indicates, the layer trait entries are sorted by TOF such that they are listed from the slowest TOF (i.e., highest TOF value) to the fastest TOF (i.e., the lowest TOF value). The delta TOF (ΔTOF) is determined for each adjacent pair of entries. For example, the TOF for the first entry is 448.2 and the TOF for the adjacent second entry is 344.6. The ΔTOF is given by (344.6-448.2)/448.2 (=−23%). At block 360, a threshold ΔTOF (absolute value) may be specified as 10%, for example. In that case, only the last entry in Table 2, which is associated with a ΔTOF of −7%, would be eliminated at block 360.

At block 370, eliminating adjacent layer traits with similar reach length represents an optional fourth pruning process in the method 300. The sorting by TOF is maintained in order to compare the reach length of adjacent layer trait entries. Reach length indicates the maximum length of a corresponding wire 170 between buffer cells and is determined based on slew. That is, the reach length is a known value and is determined such that slew is maintained below a predefined maximum. The process at block 370 is illustrated using Table 3. While layer trait parameters that are relevant to the reach length comparison are indicated in Table 3, the layer trait entries can include additional parameters, as well.

TABLE 3

Exemplary sorted layer trait entries.

| layer range (label) | wire code | TOF | ΔTOF | reach length | Δreach length | worth_ratio |
|---|---|---|---|---|---|---|
| E1 H2 | W20S20L8BDP_2 | 108.4 | −75% | 0.29 | | 1.29 |
| H1 H2 | W15S15LCDDP_2 | 81.7 | −25% | 0.46 | 61% | 1.22 |
| E1 H2 | W20S20LCDDP_2 | 73.8 | −10% | 0.45 | −2% | 0.95 |

As Table 3 indicates, the layer trait entries are sorted by TOF. The difference in reach length (Δreach length) of adjacent layer trait entries is determined. For example, for the last entry, the Δreach length is given by (0.45-0.46)/0.46 (=2%). If the threshold Δreach length is 10%, for example, then the last entry would be eliminated. At block 380, adding a default layer trait refers to adding a default wire code without a layer constraint.

At block 390, calculating a metric for use in wire assignments refers to calculating promotion cost as previously noted. For a given entry A in the final layer trait table following block 380, the corresponding TOF can be designated as TOF_A. For another entry B in the final layer trait table, the corresponding TOF is a lower value (i.e., faster TOF) and can be designated as TOF_B with an associated reach length of reachlength_B. Determining the metric (i.e., promotion cost) associated with using a wire 170 with the traits of entry B instead of entry A refers to determining the improvement in the signal delay, for example, that must be gained in order to promote a wire 170 from the traits of entry A to the traits of entry B. This improvement (e.g., delta delay (Δdelay)) is used by the optimization algorithms to assign layer traits to wires 170 that implement the logical connections defined by the netlist and is given by:

$$\Delta delay = weight * reachlength\_B * (TOF\_A - TOF\_B) \quad [EQ. 1]$$

In EQ. 1, the weight is a scalar value. The weight can initially be selected to be 1 and then tuned as needed.

Figure 4:
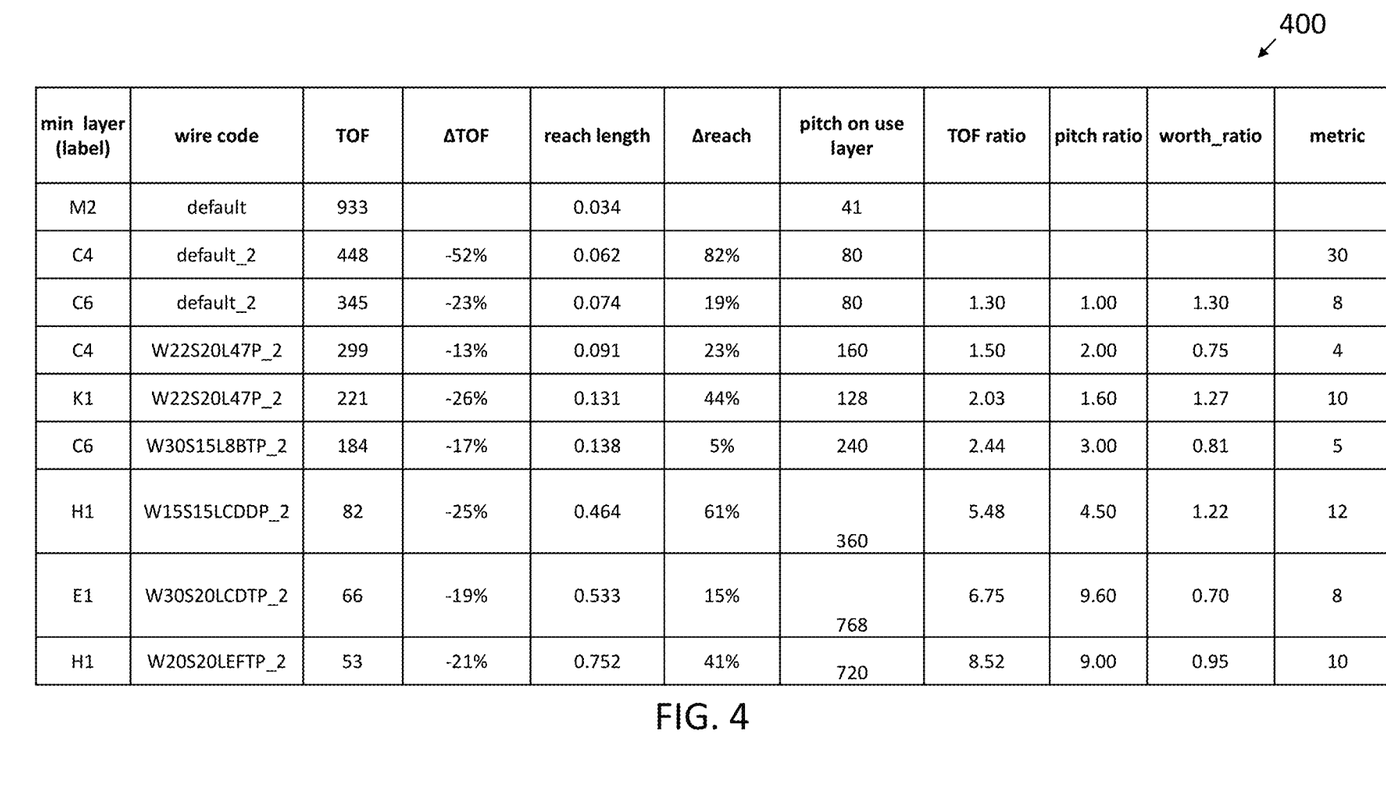
FIG. 4 shows an exemplary final list of layer traits with corresponding promotion costs resulting from performing automatic layer trait generation and promotion cost computation according to one or more embodiments of the invention.

FIG. 4 shows an exemplary final list of layer traits 400 with corresponding promotion costs resulting from performing automatic layer trait generation and promotion cost computation according to one or more embodiments of the invention. Based on the process at block 380, the first entry in final list of layer traits 400 corresponds with a default wire code. As previously noted, each wire code is a representation of a table of rules defining characteristics of a wire 170. The layer traits that are shown in the exemplary table include the minimum layer in which a particular layer trait may be used, the wire code, TOF, ΔTOF, reach length, Δreach length, pitch on the use layer (i.e., metal layer 220 on which a wire 170 with the layer trait is actually formed), TOF ratio, pitch ratio, and worth_ratio. The metric (i.e., promotion cost), determined according to EQ. 1, for example, is also indicated in the exemplary final list. This metric indicates the improvement (in delay, for example) that is needed to justify moving a wire 170 to an adjacent higher metal layer 220 in order to use the corresponding layer trait. Additional characteristics can be included or some characteristics can be excluded. As previously noted, once this final list of layer traits 400 is generated, the routing specification can be generated by an optimization algorithm that determines the metal layer 220 and route for each wire 170.

Figure 5:
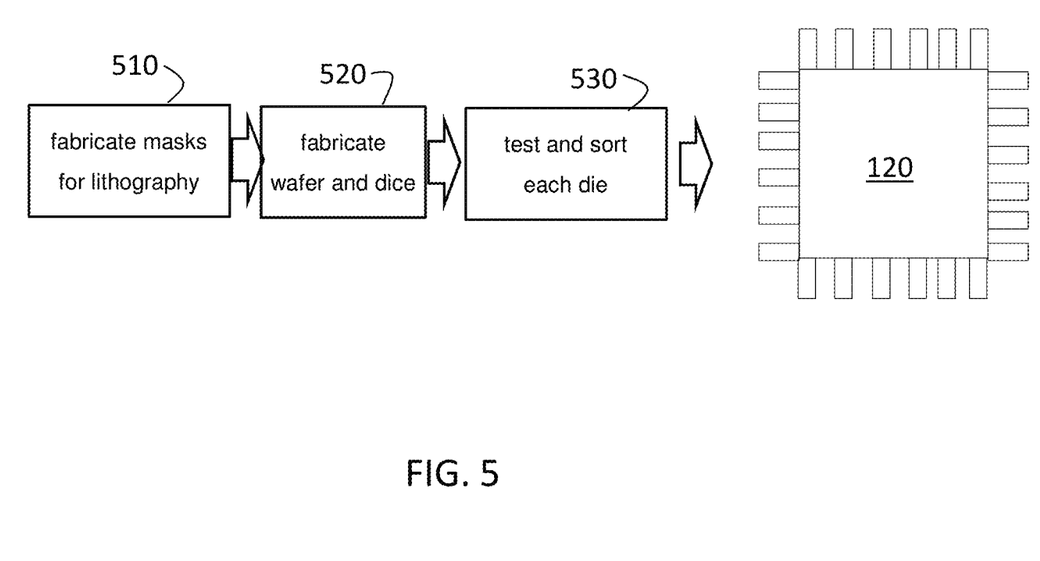
FIG. 5 is a process flow of a method of fabricating the integrated circuit according to exemplary embodiments of the invention.

FIG. 5 is a process flow of a method of fabricating the integrated circuit according to exemplary embodiments of the invention. Once the physical design data is obtained, based, in part, on the pessimism reduction in cross-talk noise determination according to embodiments of the invention, the integrated circuit 120 can be fabricated according to known processes that are generally described with reference to FIG. 5. Generally, a wafer with multiple copies of the final design is fabricated and cut (i.e., diced) such that each die is one copy of the integrated circuit 120. At block 510, the processes include fabricating masks for lithography based on the finalized physical layout. At block 520, fabricating the wafer includes using the masks to perform photolithography and etching. Once the wafer is diced, testing and sorting each die is performed, at block 530, to filter out any faulty die.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer-implemented method, comprising:
   obtaining, using a processor, a master list of layer traits including wire codes, each of the wire codes indicating a width of a corresponding wire, and including a maximum reach length of the corresponding wire and a time of flight (TOF) through the corresponding wire;
   processing, using the processor, the master list of the layer traits to obtain a final list of the layer traits, the final list of the layer traits having fewer entries than the master list of the layer traits and being in a ranked order; and
   calculating a metric, using the processor, for each adjacent pair of the layer traits in the final list of layer traits, the calculating using the TOF of each of the pair of the layer traits and the metric being associated with using one of the pair of the layer traits instead of another of the pair of layer traits, wherein the metric is a promotion cost indicating improvement in signal delay that must be gained to use the one of the pair of the layer traits instead of the other of the pair of the layer traits for each of the pair of the layer traits and the final list of the layer traits and the corresponding metric is used to assign the corresponding wires to different interconnects among components of an integrated circuit.

2. The method according to claim 1, wherein the processing the master list of the layer traits includes performing three separate pruning processes to eliminate entries in the master list of the layer traits.

3. The method according to claim 2, wherein performing a first pruning process among the three separate pruning processes includes eliminating the entries of the master list of the layer traits that specify a same layer range and width as other entries of the master list of the layer traits with the TOF being slower and generating a first intermediate list of the layer traits based on the first pruning process.

4. The method according to claim 3, wherein performing a second pruning process among the three separate pruning processes includes sorting the entries in the first intermediate list of the layer traits by the TOF, calculating a worth_ratio value for each adjacent pair of the entries, and eliminating the entries with the worth_ratio value below a threshold value to generate a second intermediate list of the layer traits, each worth_ratio value being a ratio of a ratio of TOF values of the adjacent pair of entries to a ratio of pitch values of the adjacent pair of entries.

5. The method according to claim 4, wherein performing a third pruning process among the three separate pruning processes includes eliminating the entries of the second intermediate list of the layer traits with the TOF being slower than the TOF of the entry adjacent in the second intermediate list of the layer traits.

6. The method according to claim 5, further comprising performing an additional pruning process based on the reach length for the entries remaining in the second intermediate list of the layer traits following the third pruning process.

7. The method according to claim 1, wherein the calculating the metric includes using a weight that is a scalar value and is tuned from an initial value of 1.

8. A system, comprising:
a memory device configured to store a master list of layer traits including wire codes, each of the wire codes indicating a width of a corresponding wire, and including a maximum reach length of the corresponding wire and a time of flight (TOF) through the corresponding wire; and
a processor configured to process the master list of the layer traits to obtain a final list of the layer traits, the final list of the layer traits having fewer entries than the master list of the layer traits and being in a ranked order, and to calculate a metric for each adjacent pair of the layer traits in the final list of layer traits using the TOF of each of the pair of the layer traits, wherein the metric is a promotion cost indicating improvement in signal delay that must be gained to use one of the pair of the layer traits instead of another of the pair of layer traits, and the final list of the layer traits and the corresponding metric is used to assign the corresponding wires to different interconnects among components of an integrated circuit.

9. The system according to claim 8, wherein the processor is configured to process the master list of the layer traits by performing three separate pruning processes to eliminate entries in the master list of the layer traits.

10. The system according to claim 9, wherein the processor is configured to perform a first pruning process among the three separate pruning processes by eliminating the entries of the master list of the layer traits that specify a same layer range and width as other entries of the master list of the layer traits with the TOF being slower and generating a first intermediate list of the layer traits based on the first pruning process.

11. The system according to claim 10, wherein the processor is configured to perform a second pruning process among the three separate pruning processes by sorting the entries in the first intermediate list of the layer traits by the TOF, calculating a worth_ratio value for each adjacent pair of the entries, and eliminating the entries with the worth_ratio value below a threshold value to generate a second intermediate list of the layer traits, each worth_ratio value being a ratio of a ratio of TOF values of the adjacent pair of entries to a ratio of pitch values of the adjacent pair of entries.

12. The system according to claim 11, wherein the processor is configured to perform a third pruning process among the three separate pruning processes by eliminating the entries of the second intermediate list of the layer traits with the TOF being slower than the TOF of the entry adjacent in the second intermediate list of the layer traits.

13. The system according to claim 12, wherein the processor is configured to perform an additional pruning process based on the reach length for the entries remaining in the second intermediate list of the layer traits following the third pruning process.

14. The system according to claim 8, wherein the processor is configured to calculate the metric by using a weight that is a scalar value and is tuned from an initial value of 1.

15. A computer program product for performing integrated circuit development, the computer program product comprising a computer readable storage medium having program instructions embodied therewith, the program instructions executable by a processor to perform a method comprising:
obtaining a master list of layer traits including wire codes, each of the wire codes indicating a width of a corresponding wire, and including a maximum reach length of the corresponding wire and a time of flight (TOF) through the corresponding wire;
processing the master list of the layer traits to obtain a final list of the layer traits, the final list of the layer traits having fewer entries than the master list of the layer traits and being in a ranked order; and
calculating a metric for each adjacent pair of the layer traits in the final list of layer traits, the calculating using the TOF of each of the pair of the layer traits and the metric being associated with using one of the pair of the layer traits instead of another of the pair of layer traits, wherein the metric is a promotion cost indicating improvement in signal delay that must be gained to use the one of the pair of the layer traits instead of the other of the pair of the layer traits for each of the pair of the layer traits and the final list of the layer traits and the corresponding metric is used to assign the corresponding wires to different interconnects among components of an integrated circuit.

16. The computer program product according to claim 15, wherein performing a first pruning process among three separate pruning processes includes eliminating the entries of the master list of the layer traits that specify a same layer range and width as other entries of the master list of the layer traits with the TOF being slower and generating a first intermediate list of the layer traits based on the first pruning process.

17. The computer program product according to claim 16, wherein performing a second pruning process among the three separate pruning processes includes sorting the entries in the first intermediate list of the layer traits by the TOF, calculating a worth_ratio value for each adjacent pair of the entries, and eliminating the entries with the worth_ratio value below a threshold value to generate a second intermediate list of the layer traits, each worth_ratio value being a ratio of a ratio of TOF values of the adjacent pair of entries to a ratio of pitch values of the adjacent pair of entries.

18. The computer program product according to claim 17, wherein performing a third pruning process among the three separate pruning processes includes eliminating the entries of the second intermediate list of the layer traits with the TOF being slower than the TOF of the entry adjacent in the second intermediate list of the layer traits.

19. The computer program product according to claim 18, further comprising performing an additional pruning process based on the reach length for the entries remaining in the second intermediate list of the layer traits following the third pruning process.

20. The computer program product according to claim 15, wherein the calculating the metric includes using a weight that is a scalar value and is tuned from an initial value of 1.

* * * * *